United States Patent
Kondasani (10) Patent No.: US 8,671,108 B2
(45) Date of Patent: Mar. 11, 2014

(54) METHODS AND SYSTEMS FOR DETECTING WEBSITE ORPHAN CONTENT

(75) Inventor: Thakur B. Kondasani, St. Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 179 days.

(21) Appl. No.: 13/225,221

(22) Filed: Sep. 2, 2011

(65) Prior Publication Data

US 2013/0060805 A1   Mar. 7, 2013

(51) Int. Cl.
*G06F 17/30* (2006.01)

(52) U.S. Cl.
USPC .................................. 707/769; 707/E17.014

(58) Field of Classification Search
None
See application file for complete search history.

(56) References Cited

U.S. PATENT DOCUMENTS

| | | | |
|---|---|---|---|
| 5,694,603 A | 12/1997 | Reiffin | |
| 5,694,604 A | 12/1997 | Reiffin | |
| 6,189,019 B1 * | 2/2001 | Blumer et al. | 715/205 |
| 6,253,204 B1 | 6/2001 | Glass et al. | |
| 6,449,739 B1 | 9/2002 | Landan | |
| 6,934,697 B1 | 8/2005 | Warren | |
| 7,139,747 B1 | 11/2006 | Najork | |
| 7,290,131 B2 | 10/2007 | Beynon et al. | |
| 7,290,205 B2 * | 10/2007 | Moncsko et al. | 715/208 |
| 7,379,965 B2 | 5/2008 | Sherwood et al. | |
| 7,620,887 B1 | 11/2009 | Lubbers et al. | |
| 7,818,312 B2 | 10/2010 | Broder et al. | |
| 7,822,927 B1 * | 10/2010 | Scheer | 711/133 |
| 2005/0021997 A1 * | 1/2005 | Beynon et al. | 713/200 |
| 2005/0071766 A1 | 3/2005 | Brill et al. | |
| 2006/0112089 A1 | 5/2006 | Broder et al. | |
| 2007/0100865 A1 * | 5/2007 | King et al. | 707/102 |
| 2007/0162419 A1 * | 7/2007 | Ahn et al. | 707/1 |
| 2008/0097977 A1 | 4/2008 | Broder et al. | |
| 2008/0097978 A1 | 4/2008 | Broder et al. | |
| 2009/0187581 A1 | 7/2009 | Delisle et al. | |
| 2011/0153631 A1 * | 6/2011 | Kondasani | 707/758 |

OTHER PUBLICATIONS http://www.relsoftware.com/wlv/; "Web Link Validator: The Broken Links Doctor"; Copyright 2001-2009 REL Software; 2 pages.

http://www.wrensoft.com/zoom/; Zoom Website Search Engine—Add search to a website, intranet or CD; Copyright 2008 Wrensoft; 3 pages.

http://www.netmechanic.com/link_check.htm; Link checker and HTML code checking by NetMechanic; Copyright 1996-2007 Keynote NetMechanic; 3 pages.

http://www.intranetjournal.com/reviews/idm0997-linkbot.shtml; Rob Bilson "Linkbot Pro 3.0"; Tetranet Software, Inc.; originally appeared in IDM, vol. 2, No. 19, Sep. 11, 1997; 4 pages.

(Continued)

*Primary Examiner* — Anteneh Girma
(74) *Attorney, Agent, or Firm* — Armstrong Teasdale LLP (57) ABSTRACT

A method and system for detecting orphan content in a hierarchical data tree are provided. The method includes receiving, at the computer, a selection of at least one directory that includes a plurality of data files to be analyzed, analyzing all links embedded within the data files stored in the at least one selected directory, detecting files that are not referenced by a link in any other data file, determining that no other links are embedded within the data files stored in the at least one selected directory, and generating an orphan content report that includes link data for each orphan file detected.

21 Claims, 8 Drawing Sheets

(56) References Cited

OTHER PUBLICATIONS http://www.ixacta.com/products/ixsitet/; "Ixsite Web Analyzer: Website Analysis Software"; Copyright 2008 Ixacta, Inc. 1 page.

http://www.ixacta.com/products/ixsite/details/linkchecker.html; "Link Checker: Find Broken Links"; Copyright 2008 Ixacta, Inc. 2 pages.

International Search Report and Written Opinion for International application No. PCT/US12/52701, Nov. 2, 2012, (9 Pages).

\* cited by examiner

| |
|---|
| d:/data/wwwdocs/markets_us/us/commerce_dev/index_old1.shtm |
| d:/data/wwwdocs/gto/systems/ent_arch/exlib/dyncapmap/archives/6_01_2011/mspinfo/... |
| d:/data/wwwdocs/gto/systems/all_hands_mtp/all handsresentation/12-3-03_files/slide0732.htm |
| d:/data/wwwdocs/lfi/myproject/safe_billing_3.1_7113.shtm |
| d:/data/wwwdocs/gto/service_mgmt/cust_service_mgmt/manuals_eur/region_nsapa/c5/event_2lb502dcs1.htm |
| d:/data/wwwdocs/gto/systems/ent_arch/ealib/dyncapmap_stage/archives/5_17_2011/plans/mobilepay... |
| d:/data/wwwdocs/gto/systems/brown_bags/mccabe_code_dev_files/slide0083.htm |
| d:/data/wwwdocs/gto/service_mgmt/cust_service_mgmt/manuals_mp/region_lac/c1/event... |
| d:/data/wwwdocs/gto/systems/ent_arch/ealib/dyncapmap_stage/archives/5_17_2011/mapinfo/mup1220/... |
| d:/data/wwwdocs/gto/tpo_cs/process_optimizaton/process_library/methodology/mup/region_sepa/c3/event... |
| d:/data/wwwdocs/gps/core_prod/demos/prod/scripted_demos/xp_core_screens/bulk/zzz_bulk_credit... |
| d:/data/wwwdocs/gto/service_mgmt/cust_service_mgmt/manuals_eur/region_nsepa/c5/event... |
| d:/data/wwwdocs/gto/service_mgmt/cust_service_mgmt/mpe/webhelp_old/first_topic.htm |
| d:/data/wwwdocs/gto/tpo_cs/process_optimizaton/process_library/methodology/mup/agile mup 1105... |
| d:/data/wwwdocs/gto/service_mgmt/cust_service_mgmt/shared/rlc/releases/11_i/rel_doc/11_1_sms... |
| d:/data/wwwdocs/home/roles/developer/flex/flex_animation/flex.html |
| d:/data/wwwdocs/gto/tpo_cs/process_navigator/projectnavigator/htmlfiles/cm_cab... |
| d:/data/wwwdocs/gto/systems/ent_arch/ealib/dyncapmap/archives/5_17_2011/mapinfo/consumer... |
| d:/data/wwwdocs/gto/tpo_cs/process_optimizaton/process_library/methodology/mup/mapinfo/consumer... |
| d:/data/wwwdocs/gto/tpo_cs/archive/pmcoe/mup/mup1220/tech.j2ee/guidance/toolmentors/execute... |

METHODS AND SYSTEMS FOR DETECTING WEBSITE ORPHAN CONTENT

BACKGROUND OF THE INVENTION

The field of the present disclosure relates generally to managing website content, and more particularly, to methods and systems for detecting orphan content within websites.

Many entities create and maintain a network of client systems and server systems to facilitate transferring electronic files from the server systems to the client systems. Typically, a user accesses electronic files stored by the server systems using a network-enabled client system, for example, a computer. The content stored by the server systems may include electronic documents, electronic files, and/or other forms of electronic data. A hierarchical system of directories is often used to organize the content. The content may also be organized and accessible to users by interlinking the content, for example, using a website. The website is a collection of web pages that can be accessed and viewed using a web browser. Typically, client systems include web browsers. When accessed by the web browser, the web pages display information for use by users who are allowed access to the network and facilitate interaction between the client system and the server system.

For example, many organizations create and maintain an internal organization website for use by users, for example, employees, contractors, and vendors. Each department of a multi-department organization may create and store electronic documents on the server system. Those documents may be organized and made accessible to the users by adding one or more web pages to the organization website that include links to the documents. Some examples of organization websites are known to include thousands of web pages and thousands of documents, interconnected by tens of thousands of links. Typically, each web page and each electronic document exists as a separate entity, which is each identified by a unique address on the network called a Uniform Resource Locator (URL). Embedded within a first web page may be a link to a second web page or to a document. In this example, the first web page is referred to as a source file and the second web page is referred to as a target file. More specifically, the link embedded in the source file includes a URL which points to the target file. If the link is functioning properly, when the user selects the link while viewing the source file using the client system, the user is then provided with the target file via the client system.

If the target file has been moved or added to the server system or if the URL of the target file has been changed there may be no link that points to the target file. In such a case there is no way to access the data in the target file because no link is available to permit a user to select to access the target file. Orphan content causes user frustration and work-place inefficiency. When a target file is inaccessible, the value of the target file is reduced due to the inability to access the information contained in the target file. Locating the orphan content within a website allows links to be created, either by editing the source files or by changing the URL of the target files to match the source file links.

Software is currently available for checking the validity of hypertext links embedded within web pages. Typically, a spider technology is used to "crawl" an intranet or Internet web. Spider software is initialized by a user to begin on a certain web page (i.e., a first active web page). The software parses the first active web page for a link. Once the software identifies the link, the software selects the link, closing the first active web page and opening the target web page, which becomes a second active web page. The software begins to parse the second active web page to identify a link. Once a link is found in the second active web page, the software selects the link and the target web page associated with the link becomes a third active web page. The software operates under an assumption that the web pages being analyzed are sufficiently interconnected to ensure the software parses all of the web pages. For this reason, crawling between web pages upon identification of a link does not ensure that all web pages are parsed, and also does not ensure that all links within each web page are analyzed.

It would be desirable for users to be able to automatically detect orphan content in a large data tree structure on a regular basis to ensure efficient utilization of memory and computing resources.

BRIEF DESCRIPTION OF THE INVENTION

In one embodiment, a method for detecting orphan content stored in a memory and organized within a hierarchical data tree includes receiving, at the computer, a selection of at least one directory that includes a plurality of data files to be analyzed, analyzing all links embedded within the data files stored in the at least one selected directory, detecting data files that are not referenced by at least one of the analyzed links in the at least one selected directory wherein the detected data files are orphan files, determining that no other links are embedded within the data files stored in the at least one selected directory, and generating an orphan content report that includes link data for each orphan file detected.

In another embodiment, a method for detecting orphan content in a hierarchical data tree includes creating a hashtable including a file identifier, a file identifier value, a link identifier, and a link identifier value, determining a starting directory in the data tree structure, and iteratively processing each object in the starting directory. The method also includes if the object is a sub-directory, iteratively processing each object in the sub-directory, if the object is a data file, iteratively processing each data file in the sub-directory, if a file identifier associated with each data file does not exist in the hashtable, creating a file identifier and associated file identifier value in the hashtable, and initializing the file identifier value, and if the file identifier associated with each data file does exist in the hashtable, extracting any links located in the data file, determining if a link identifier associated with the extracted links exists in the hashtable. The method further includes if the link identifier exists in the hashtable, incrementing the link identifier value associated with the link identifier, if the link identifier does not exist in the hashtable, creating the link identifier in the hashtable and initializing the link identifier value associated with the link identifier, returning to process the next object in the sub-directory, and outputting all file identifiers in the hashtable having an associated file identifier value that has not been incremented.

In yet another embodiment, one or more non-transitory computer-readable storage media for detecting orphan content within a plurality of data files stored in at least one directory of a data tree includes computer-executable instructions embodied thereon, wherein when executed by at least one processor, the computer-executable instructions cause the processor to receive a selection, from a user, of at least one directory that includes a plurality of data files to be processed, process the plurality of data files to identify links embedded within the data files, process the links to detect orphan content in the data tree, and generate an orphan content report that includes orphan content data for each orphan content detected.

In yet still another embodiment, a computer system for detecting orphan content stored within a memory device and organized within a hierarchical data tree is programmed to receive, at the computer system, a selection of at least one directory that includes a plurality of data files to be analyzed, analyze all links embedded within the data files stored in the at least one selected directory, and detect data files that are not referenced by at least one of the analyzed links in the at least one selected directory, the detected data files being orphan files. The computer system is also programmed to determine that no other links are embedded within the data files stored in the at least one selected directory, and generate an orphan content report that includes link data for each orphan file detected.

BRIEF DESCRIPTION OF THE DRAWINGS

FIGS. 1-7 show exemplary embodiments of the methods and apparatus described herein.

FIG. 7 is a screen shot of an orphan files output from method in accordance with an exemplary embodiment of the present invention.

DETAILED DESCRIPTION OF THE INVENTION

Set forth below is a description of methods and systems for locating orphan website content. The methods and systems are sometimes described as being practiced utilizing an intranet or the Internet. An intranet and the Internet, however, are examples of communication networks, and the methods and systems described herein can be practiced in connection with many other local area and wide area networks. Therefore, the methods and systems are not limited to a practice of using an intranet and/or the Internet, and can be practiced using many other networks. By automatically, searching the directories of the data tree structure for source data files, parsing the data files located within the directories, extracting links to target files in the parsed source data files, and matching the links to the target files, and outputting the target files that do not have corresponding links, the user is able to remediate the orphan content quickly and easily.

As used herein the term "link" or "links" is defined to include a computer instruction that connects a first data file or a portion of the first data file to either another portion of the first data file or a second data file. In other words, a link is a navigation tool that connects portions of data files or separate data files together. A link can also be described as a pointer that points to another file or another computer record.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
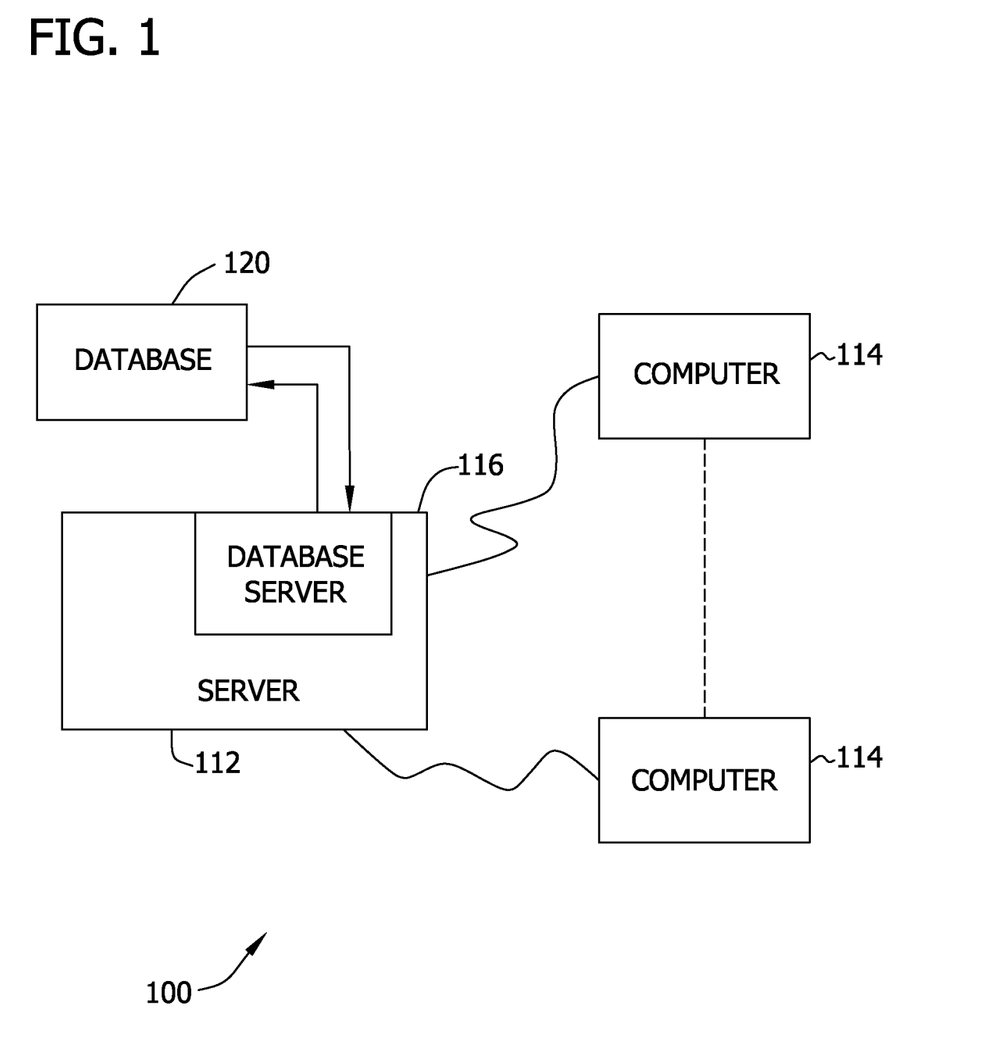
FIG. 1 is a simplified block diagram of an exemplary system in accordance with one embodiment of the present invention.

FIG. 1 is a simplified block diagram of an exemplary system 100 in accordance with one embodiment of the present invention. System 100 is a client/server system that may be utilized for storage and delivery of files. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 may be interconnected to the Internet through a variety of interfaces including a network, such as a local area network (LAN) or a wide area network (WAN), dial-in-connections, cable modems and special high-speed ISDN lines. Client systems 114 could be any device capable of interconnecting to the Internet including a personal computer (PC), a web-based phone, personal digital assistant (PDA), or other web-based connectable equipment.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. Database 120 may store electronic files. Electronic files may include electronic documents, web pages, image files, sound files, video files, and/or electronic data of any format suitable for storage in database 120 and delivery using system 100. As described above, a organization's website typically includes a plurality of individual web pages that are linked, for example, by hyperlinks. The hyperlinks facilitate navigation between the web pages. Each individual web page is identified by a unique address called a Uniform Resource Locator (URL). In some embodiments, the web pages are stored by a single server system, for example, server system 112. In other embodiments, the web pages may be stored by multiple server systems, all of which are accessible by client systems 114 via, for example, the Internet. The individual web pages may also include links to electronic files and/or electronic documents, which are also identified by a unique address. Web pages, electronic documents, and/or electronic data of any format that is accessible using links will be referred to herein as electronic files. As described herein, a source electronic file is a file that includes a hyperlink that points to a target electronic file. If an address of the target file changes the hyperlink within the source file that points to the target file no longer points to the target file, which then may become orphan content if no other link points to this file. Should a user viewing the source file select the link, server system 112 will return an error message to the user informing the user that the target file no longer exists or has been moved.

Figure 2:
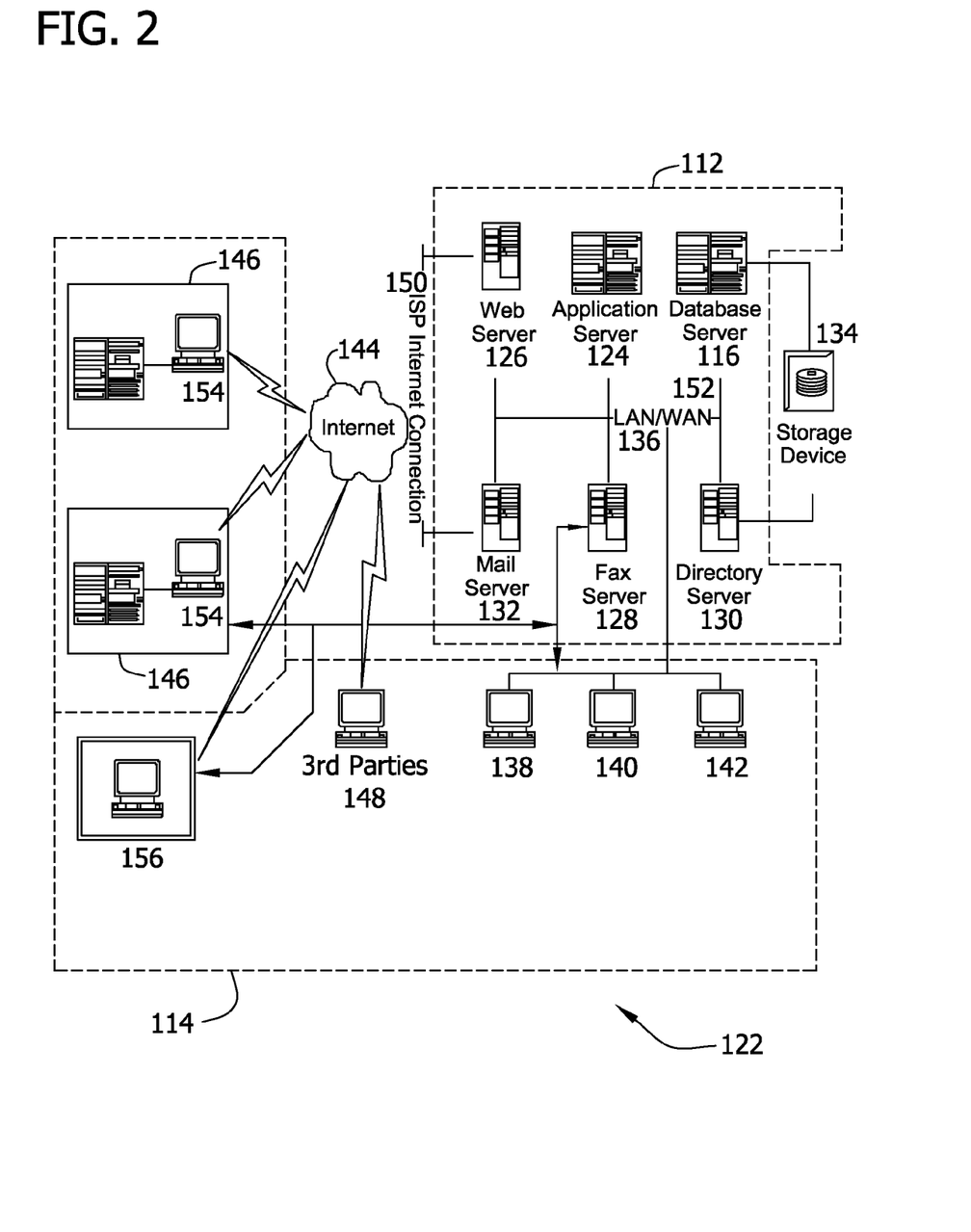
FIG. 2 is an expanded block diagram of an exemplary embodiment of a server architecture of a system for detecting orphan content.

FIG. 2 is an expanded block diagram of an exemplary embodiment of a server architecture of a system 122 for detecting orphan content. More specifically, in the exemplary embodiment, system 122 analyzes all links included within source files located in a selected directory. Components in system 122, identical to components of system 100 (shown in FIG. 1), are identified in FIG. 2 using the same reference numerals as used in FIG. 1. System 122 includes server system 112 and client systems 114. Server system 112 further includes database server 116, an application server 124, a web server 126, a fax server 128, a directory server 130, and a mail server 132. A storage device 134, for example, a disk storage unit, is coupled to database server 116 and directory server 130. Storage device 134 may be configured to store a database, for example, database 120 (shown in FIG. 1). Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136, for example, using an Internet 144 link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 146 and other third parties 148, using an ISP Internet connection 150. The communication in the exemplary embodiment is illustrated as being performed using the Internet 144, however, any other wide area network (WAN) type communication can be utilized in other embodiments, i.e., the systems and processes are not limited to being practiced using Internet 144. In addition, and rather than WAN 152, local area network 136 could be used in place of WAN 152.

In the exemplary embodiment, any authorized individual having a workstation 154 can access system 122. At least one of the client systems includes a manager workstation 156 located at a remote location. In the exemplary embodiment, workstations 154 and 156 are personal computers having a web browser. Also, workstations 154 and 156 are configured to communicate with server system 112. Furthermore, fax server 128 communicates with remotely located client systems, including client system 114 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
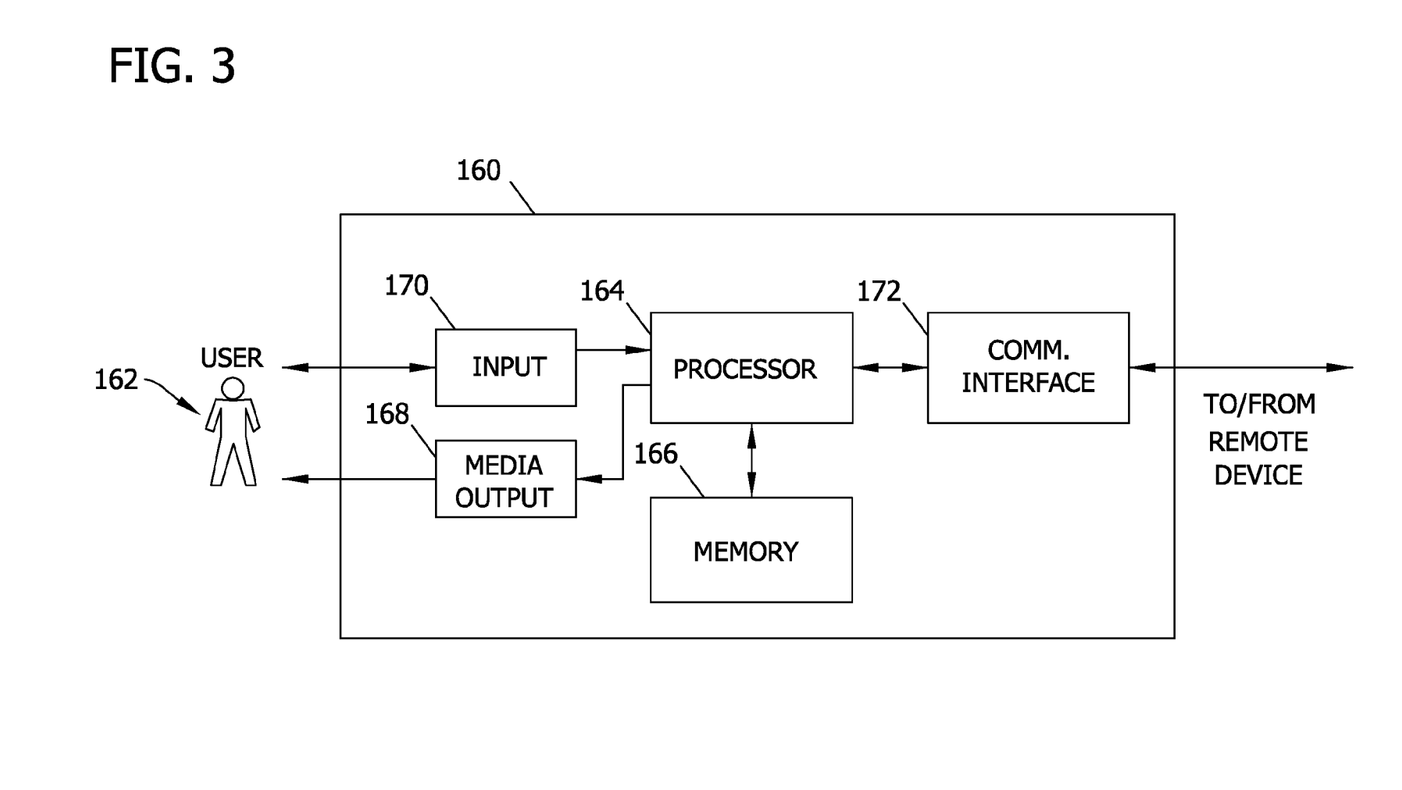
FIG. 3 illustrates an exemplary configuration of a user computing device operated by a user.

FIG. 3 illustrates an exemplary configuration of a user computing device 160 operated by a user 162. User computing device 160 may include, but is not limited to, client systems 114, 138, 140, and 142, workstation 154, and manager workstation 156 (shown in FIG. 2).

User computing device 160 includes a processor 164 for executing instructions. In some embodiments, a memory area 166, or other computer-readable media, stores executable instructions. Processor 164 may include one or more processing units (e.g., in a multi-core configuration). Memory area 166 is any device allowing information such as executable instructions and/or written works to be stored and retrieved. Memory area 166 may include one or more computer-readable media.

User computing device 160 also includes at least one media output component 168 for presenting information to user 162. Media output component 168 is any component capable of conveying information to user 162. In some embodiments, media output component 168 includes an output adapter such as a video adapter and/or an audio adapter. An output adapter is operatively coupled to processor 164 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 160 includes an input device 170 for receiving input from user 162. Input device 170 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 168 and input device 170.

User computing device 160 may also include a communication interface 172, which is communicatively couplable to a remote device such as server system 112 (shown in FIG. 2). Communication interface 172 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 166 are, for example, computer readable instructions for providing a user interface to user 162 via media output component 168 and, optionally, receiving and processing input from input device 170. A user interface may include, among other possibilities, a web browser and client application. Web browsers enable users, such as user 162, to display and interact with media and other information typically embedded on a web page or a website from server system 112. A client application allows user 162 to interact with a server application from server system 112.

Figure 4:
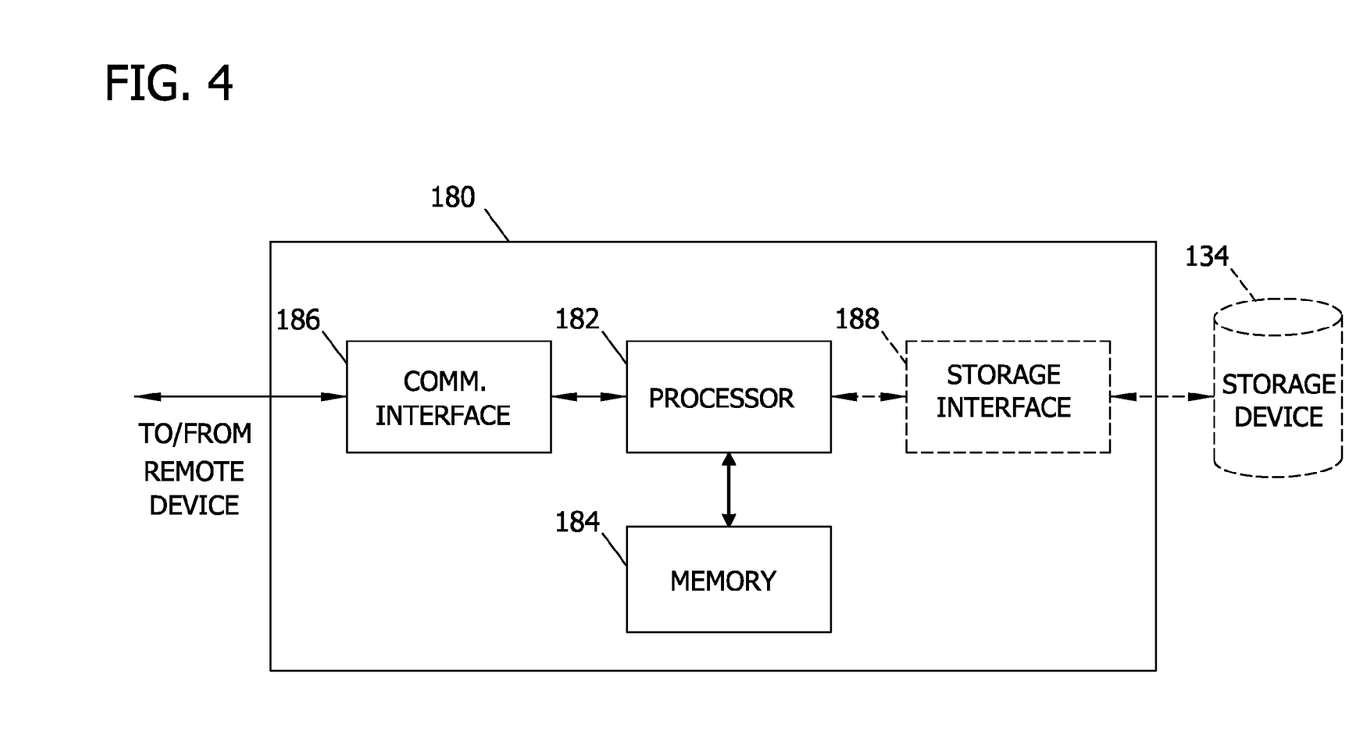
FIG. 4 illustrates an exemplary configuration of a server computing device such as the server system shown in FIG. 2.

FIG. 4 illustrates an exemplary configuration of a server computing device 180 such as server system 112 (shown in FIG. 2). Server computing device 180 may include, but is not limited to, database server 116, application server 124, web server 126, fax server 128, directory server 130, and mail server 132.

Server computing device 180 also includes a processor 182 for executing instructions. Instructions may be stored, for example, in a memory area 184 or other computer-readable media. Processor 182 may include one or more processing units (e.g., in a multi-core configuration).

Processor 182 is operatively coupled to a communication interface 186 such that server computing device 180 is capable of communicating with a remote device such as user computing device 160 (shown in FIG. 3) or another server computing device 180. For example, communication interface 186 may receive requests from client system 114 via the Internet, as illustrated in FIG. 2.

Processor 182 may also be operatively coupled to storage device 134. Storage device 134 is any computer-operated hardware suitable for storing and/or retrieving data. In some embodiments, storage device 134 is integrated in server computing device 180. For example, server computing device 180 may include one or more hard disk drives as storage device 134. In other embodiments, storage device 134 is external to server computing device 180 and may be accessed by a plurality of server computing devices 180. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 182 is operatively coupled to storage device 134 via a storage interface 188. Storage interface 188 is any component capable of providing processor 182 with access to storage device 134. Storage interface 188 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 182 with access to storage device 134.

Figure 5:
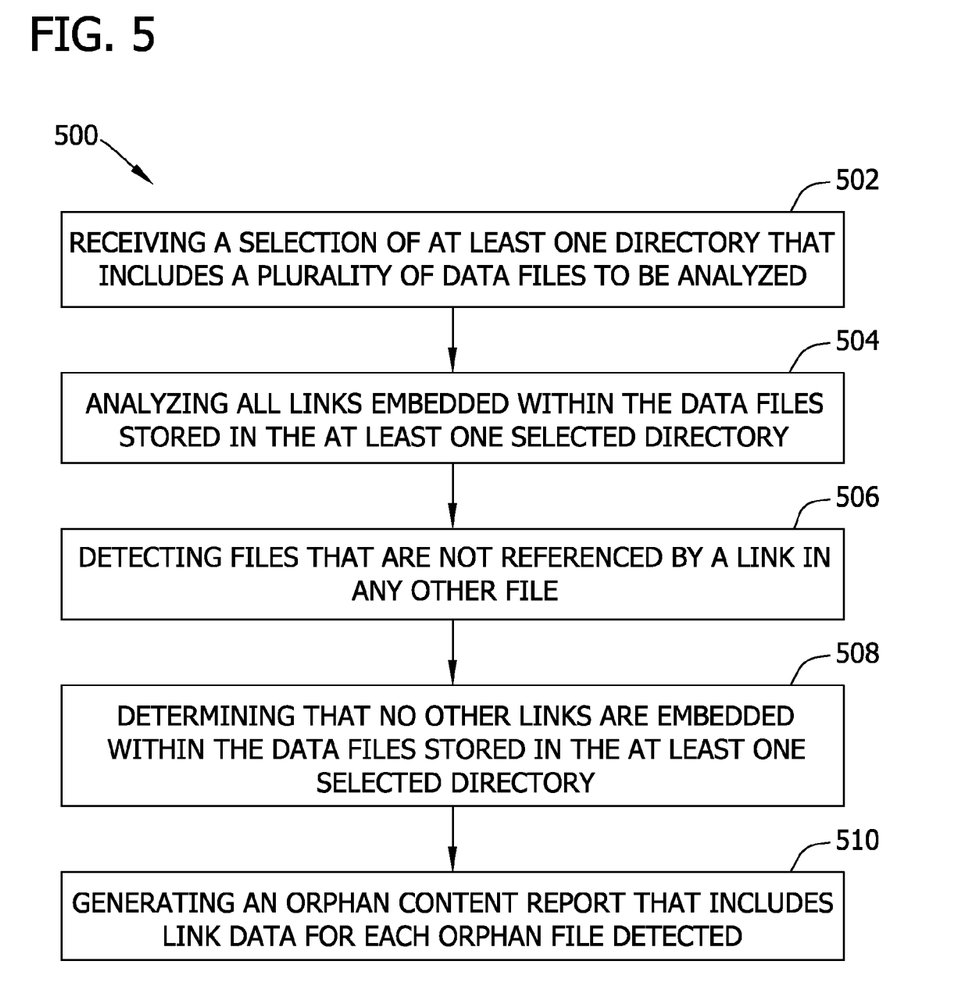
FIG. 5 is a flow chart of an exemplary method for detecting orphan content using the system shown in FIG. 1.

FIG. 5 is a flow chart of an exemplary method 500 for detecting orphan content using system 100 (shown in FIG. 1). More specifically, method 500 is used to detect content in one or more websites that do not have corresponding links directing traffic to the content. In such a case, the content is inaccessible and unusable to users. The inaccessible content unnecessarily uses valuable storage resources without providing a benefit to system 100 and the users. In an exemplary embodiment, method 500 is a computer-implemented method, for example, a computer-implemented method executed by workstation 154 (shown in FIG. 2). In another exemplary embodiment, a computer program embodied on a computer readable medium includes at least one code segment, that when executed by a computer, for example, workstation 154, performs method 500.

As described above, storage device 134 (shown in FIG. 2) of system 122 (shown in FIG. 2) stores electronic files, for example, electronic documents, web pages, image files, sound files, and video files. The electronic files stored in storage device 134 may be organized using a system of directories, also referred to as a file system. The file system is organized as a hierarchy. The hierarchy includes a root directory, sub-directories, and files. The hierarchy of directories may also be referred to using the terms parent directory and child directory. For example, a sub-directory stored within a directory may also be referred to as a child directory relative to a parent directory. Typically, the hierarchy includes the root directory, a plurality of sub-directories stored within the root directory, and a plurality of files stored directly within the root directory and/or within the sub-directories. The root directory is the top-most directory level in the hierarchy. Stored within the root directory is a first level of sub-directories. A second level of sub-directories may be stored within the first level of sub-directories. As referred to herein, the first level of sub-directories and the second level of sub-directories are stored within the root directory. Individual electronic files may be stored in any level of directories. Although described as including three levels of directories, the system of directories may include any suitable number directory levels that allow system 122 to function as described herein. Furthermore, to facilitate navigation between the plurality of files, the files include linking addresses embedded therein. Each valid linking address connects a source file to an active target file. A linking address associated with an invalid (e.g., missing, moved, or renamed) target file is referred to herein as a broken link. Files that have no valid linking address to them in any other file are referred to as orphan content. Orphan content can not be accessed because there is no link available to a user to be able to access the file containing the content. Orphan content and broken links are sometimes related in that a broken link may result in content not having a valid linking address pointing to it.

In the exemplary embodiment, method 500 includes receiving 502 at least one control parameter from a user. For example, method 500 may include receiving 502 a selection of at least one directory that includes a plurality of data files to be analyzed. Employee 146 (shown in FIG. 2) may request execution of method 500 using workstation 154 (shown in FIG. 2). Workstation 154 receives 502 the selection of at least one directory to be analyzed. The selected directory is referred to herein as the root or starting directory. In an exemplary embodiment, the user is provided a user interface by workstation 154, and using the user interface, the user is able to input their selection of the directory to be searched for orphan content. The data or other files to be analyzed are either sub-directories or source files. As described above, for navigation between files, the source files include links embedded therein. In the exemplary embodiment, control parameters may also include, without limitation, directories that are to be excluded from analysis, file types that are to be analyzed, and any other control parameters that allow system 100 to function as described herein.

In the exemplary embodiment, method 500 further includes analyzing 504 all links embedded within the data files stored in the at least one selected directory, detecting 506 files that are not referenced by a link in any other data file, determining 508 that no other links are embedded within the data files stored in the at least one selected directory, and generating 510 an orphan content report that includes link data for each orphan file detected.

Figure 6A:
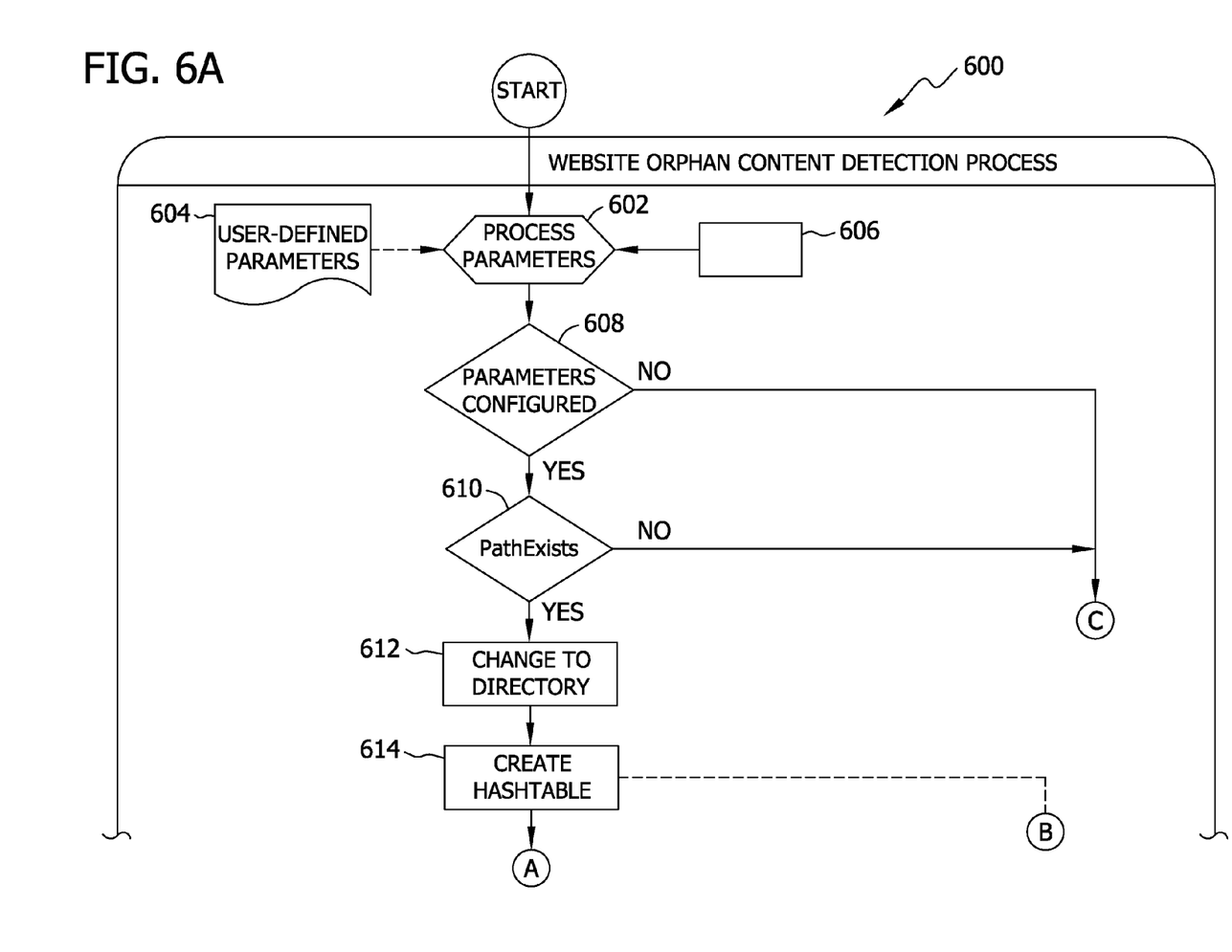
FIG. 6 is a detailed flow chart that further illustrates the steps of detecting orphan content using the method shown in FIG. 5.
Figure 6B:
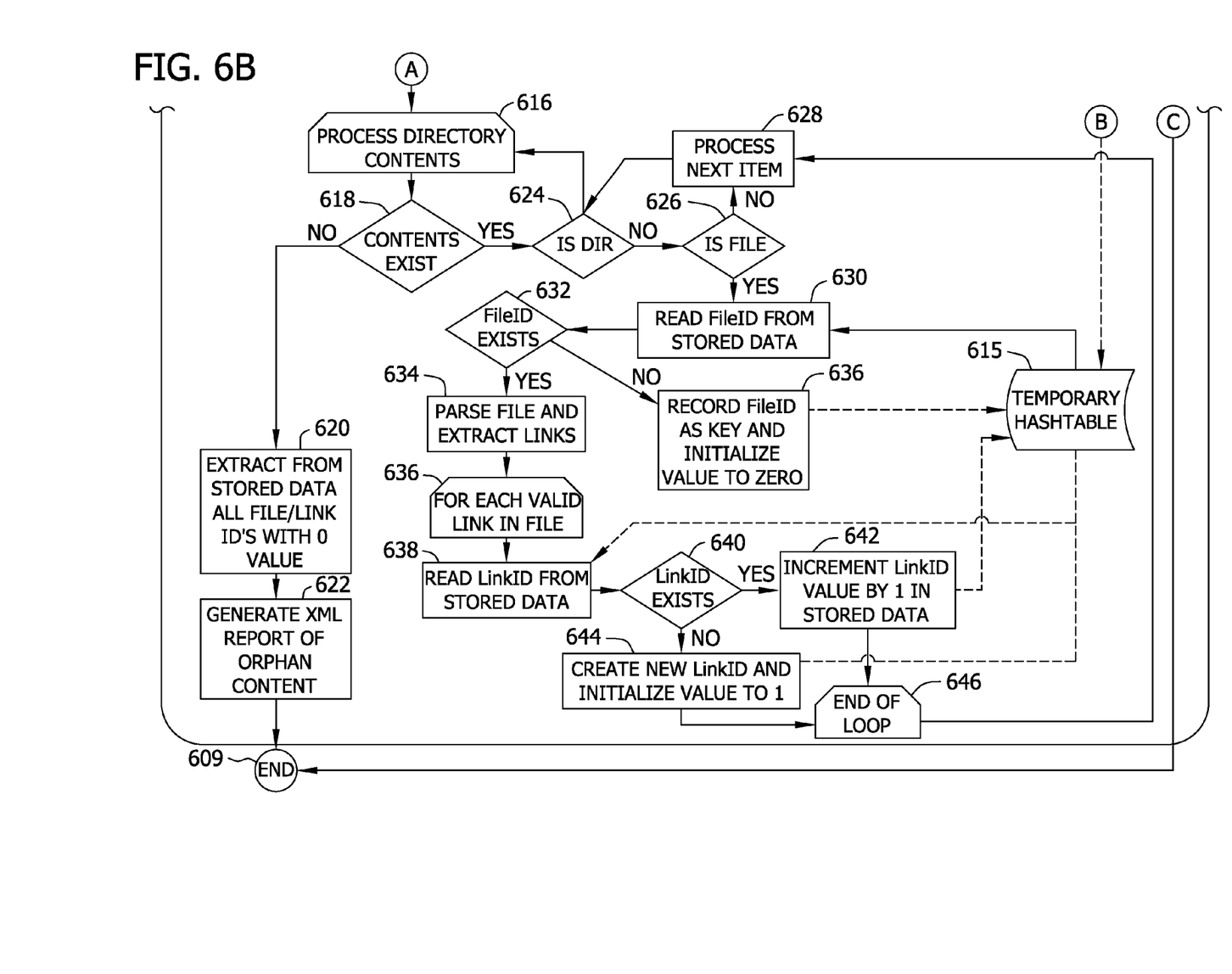

FIG. 6 is a detailed flow chart 600 that further illustrates the steps of detecting orphan content using method 500. In the exemplary embodiment, method 500 also includes reading 602 process parameters associated with the current execution of method 500. Method 500 includes receiving 602 a selection of at least one user-defined control parameter, such as a directory to be analyzed. A selection of directories to be excluded from the analysis and/or a selection of types of source files to analyze may also be received 602 via a user input. In the exemplary embodiment, user-defined process parameters are read 604 from storage. In various other embodiments, user-defined parameters are read 606 from an input device where a user can manually enter new parameters or edit existing process parameters read 604 from storage. Process parameters may include data trees to be included in the process, data trees to be excluded, individual files to be included or excluded, file extensions to be included or excluded, and/or a starting directory for the process.

Method 500 further includes determining 608 if the process parameters are properly configured. The process parameters may be considered not properly configured, for example, if the result of the process will be a null set. If the process parameters are determined to be not properly configured, method 500 ends 609. If the process parameters are determined to be properly configured, method 500 may include determining 610 whether a file path exists to the selected directory. If the file path does not exist, method 500 ends 609. For example, a list of directories may be presented to the user. If the list of directories has not been recently updated, the list may include directories that no longer exist on storage device 134 (shown in FIG. 2). Because the selected directory is no longer stored on storage device 134, scanning for orphan content would not be beneficial.

If the specified directory exists, method 210 includes accessing 612 the selected directory, whereby the selected directory becomes an active directory (i.e., the currently open directory) and creating 614 a hashtable 615 of orphan content information. Method 500 then processes 616 the contents of the specified directory. Method 500 determines 618 if the directory has any contents (data files) at all. If not, method 500 extracts 620 the orphan content information from hashtable 615, generates 622 a report of the orphan content, and ends 609 method 500.

If there is content in the directory, method 500 determines 624 if the content is another directory, which would be a sub-level directory from the specified directory. If yes, method 500 goes back to block 616 to process the subdirectory contents. If no, method 500 determines 626 if the found content is a file. If no, method 500 processes 628 the next item in the current directory. If yes, method 500 reads 630 the file ID for the file from hashtable 615, if it exists. At block 632 method 500 determines if the file ID is already in hashtable 615, if it is the file is parsed 634 and the links in the file are extracted. If not, the file ID is recorded 636 and an associated value is initialized to zero. Method 500 then proceeds to step 634.

Method 500 includes navigating through the hierarchy of directories includes traversing through the directory tree to identify the source files stored therein. For example, if it is determined 618 that the active directory is empty or that all data files in the active directory have been processed, it may be determined whether the active directory is a root directory. If the active directory is not the root directory, by definition, the active directory is stored within a parent directory. Navigating includes changing between directories until all data files within the selected directory have been processed 616 to identify source files, and all source files within the selected directory have also been processed 635 to identify links.

Each valid link in the file is determined 636 and link ID information is read 638 from hashtable 615. If the link is determined 640 to exist, the link ID value is incremented 642. If the link ID did not exist, a new link ID is created 644 and initialized to a one value. The loops ends 646 and method 500 proceeds to step 628 to process the next item.

Method 500 continues processing each file in each directory, extracting links contained in each file and updating hashtable 615 until there are no more items in the data tree or directory structure wherein a report is generated 622 listing all orphan content.

FIG. 7 is a screen shot of an orphan files output 700 from method 500 in accordance with an exemplary embodiment of the present invention. In the exemplary embodiment, orphan files output 700 includes a listing 702 of the orphan content located using the methods described herein. Each of the items 704 listed in listing 702 provides a link to the found orphan content. A user may click on the link, view the orphan content, and decide how to remediate the orphan content.

Described herein are exemplary systems and methods for detecting broken links between source files and target files. More specifically, the systems and methods described herein enable a user to analyze all links included within data files located in a selected directory. By allowing the user to select the directory, and to limit the analysis to the data files stored within that directory, the systems and methods described herein ensure the links within those data files are valid without crawling into data files the user has no interest in examining Furthermore, by limiting the analysis to the selected directory, the speed of the analysis is reduced when compared to web crawling applications.

The systems and methods described herein facilitate efficient and economical analysis of orphan content within data files stored in a selected directory and associated sub-directories. Exemplary embodiments of systems and methods are described and/or illustrated herein in detail. The systems and methods are not limited to the specific embodiments described herein, but rather, components of each system, as well as steps of each method, may be utilized independently and separately from other components and steps described herein. Each component, and each method step, can also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 164 and/or 182, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is searching a directory tree structure for orphan content, and outputting the orphan content located by the searching. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of methods and a system of detecting orphan content in a hierarchical data tree structure provides a cost-effective and reliable means automatically searching a plurality of sub-directories from a starting directory, tallying each data file that is pointed to by the links in each other data file in the data tree, and outputting information relating to the data files that do not have a link pointing to it. As a result, the methods and system described herein facilitate automatically identify and present orphan content for remediation in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for detecting orphan content stored within a memory and organized within a hierarchical data tree using a computer, the computer comprising a processor communicatively coupled to the memory, the data tree comprising a plurality of objects representing directories, data files and sublevel directories, said method comprising:
   receiving, at the computer, a selection of at least one directory that includes a plurality of data files to be analyzed;
   analyzing all links embedded within the data files stored in the at least one selected directory;
   detecting files that are not referenced by at least one of the analyzed links in the at least one selected directory, the detected files being orphan files;
   determining that no other links are embedded within the data files stored in the at least one selected directory; and
   generating an orphan content report that includes link data for each orphan file detected.

2. The method in accordance with claim 1, wherein analyzing all links embedded within the data files stored in the at least one selected directory comprises processing only the data files within the at least one selected directory to detect links to other data files.

3. The method in accordance with claim 1, further comprising at least one of receiving, at the computer, a selection of at least one of a directory to be excluded from analysis and a file type to be analyzed.

4. The method in accordance with claim 1, further comprising generating a hashtable including a file identifier and a file identification value associated with the file identifier.

5. The method in accordance with claim 1, further comprising generating a hashtable including a link identifier and a link identification value associated with the link identifier.

6. The method in accordance with claim 1, wherein analyzing all links embedded within the data files stored in the at least one selected directory comprises accessing the selected directory.

7. The method in accordance with claim 1, further comprising creating a hashtable of orphan content information.

8. The method in accordance with claim 1, further comprising processing a first data file stored within the at least one selected directory, the first data file including at least one of a sub-directory and a source file.

9. The method in accordance with claim 8, wherein processing the first data file stored within the at least one selected directory comprises:
   identifying the first data file as a first source file, the first source file including a first linking address that links the first source file to a target file;
   determining a file identifier for the first data file exists in the hash table;
   when the hash table does exist, incrementing the file identification value;
   when the hash table does not exist, creating a file identifier in the hash table and initializing an associated file identification value.

10. The method in accordance with claim 8,
    accessing the first source file; and
    extracting each valid linking address from the first source file;
    determining whether a link identifier exists for each valid linking address;
    if yes, incrementing a value associated with the linking address in the hashtable; and
    if no, creating a link identifier in the hashtable and initializing a value associated with the link identifier.

11. The method in accordance with claim 1, iteratively identifying each valid link in each data file in each selecting directory of the data tree.

12. A method of locating orphan content in a hierarchical data tree structure using a computer comprising a processor communicatively coupled to a memory, the computer coupled to a database, the data tree comprising a plurality of objects representing directories, data files and sublevel directories, the data files including links to other data files said method comprising:
   creating a hash table including a file identifier, a file identifier value, a link identifier, and a link identifier value;
   determining a starting directory in the data tree structure;
   iteratively processing each object in the starting directory;
      when the object is a sub-directory, iteratively processing each object in the sub-directory;
      when the object is a data file, iteratively processing each data file in the sub-directory;
         when a file identifier associated with each data file does not exist in the hash table, creating a file identifier and associated file identifier value in the hash table, and initializing the file identifier value;
         when the file identifier associated with each data file does exist in the hash table:
            extracting any links located in the data file;
            determine if a link identifier associated with the extracted links exists in the hash table;
            when the link identifier exists in the hash table, incrementing the link identifier value associated with the link identifier;
            when the link identifier does not exist in the hash table, creating the link identifier in the hash table and initializing the link identifier value associated with the link identifier;
            returning to process the next object in the sub-directory;
   outputting all file identifiers in the hash table having an associated file identifier value that has not been incremented.

13. The method in accordance with claim 12, further comprising receiving at least one of a selection of at least one user-defined control parameter, selection of a directory to be excluded from the analysis, and a selection of types of source files to analyze via a user input.

14. The method in accordance with claim 12, wherein receiving at least one of a selection of at least one user-defined control parameter comprises receiving a starting directory to be analyzed.

15. The method in accordance with claim 12, wherein determining a starting directory in the data tree structure comprises receiving a starting directory selection from a user.

16. The method in accordance with claim 12, further comprising determining that all objects in the starting directory and sub-directories have been processed.

17. One or more non-transitory computer-readable storage media for detecting orphan content within a plurality of data files stored in at least one directory of a data tree, said media having computer-executable instructions embodied thereon, wherein when executed by at least one processor, the computer-executable instructions cause the processor to:
   receive a selection, from a user, of at least one directory that includes a plurality of data files to be processed;

process the plurality of data files to identify links embedded within the data files;
process the links to detect orphan content in the data tree; and
generate an orphan content report that includes orphan content data for each orphan content detected.

18. The computer-readable storage media of claim 17, further comprising at least one code segment executable by a computer to instruct the computer to navigate through the plurality of data files stored within the at least one selected directory to identify links embedded therein.

19. The computer-readable storage media of claim 17, further comprising at least one code segment executable by a computer to instruct the computer to parse each data file in each directory of the data tree and extract links to other files.

20. The computer-readable storage media of claim 17, further comprising at least one code segment executable by a computer to instruct the computer to identify each file that is not linked to at least one other of the plurality of data files using a link in the at least one other of the plurality of data files.

21. A computer system for detecting orphan content stored within a memory device and organized within a hierarchical data tree, the computer system comprising the memory device and a processor in communication with the memory device, the data tree comprising a plurality of objects representing directories, data files and sublevel directories, the computer system is programmed to:
receive, at the computer system, a selection of at least one directory that includes a plurality of data files to be analyzed;
analyze all links embedded within the data files stored in the at least one selected directory;
detect data files that are not referenced by at least one of the analyzed links in the at least one selected directory, the detected data files being orphan files;
determine that no other links are embedded within the data files stored in the at least one selected directory; and
generate an orphan content report that includes link data for each orphan file detected.

* * * * *